June 17, 1930. H. FOCKE 1,764,554
ARRANGEMENT OF MOTORS ON THE WINGS OF AIRCRAFT
Filed Jan. 11, 1930
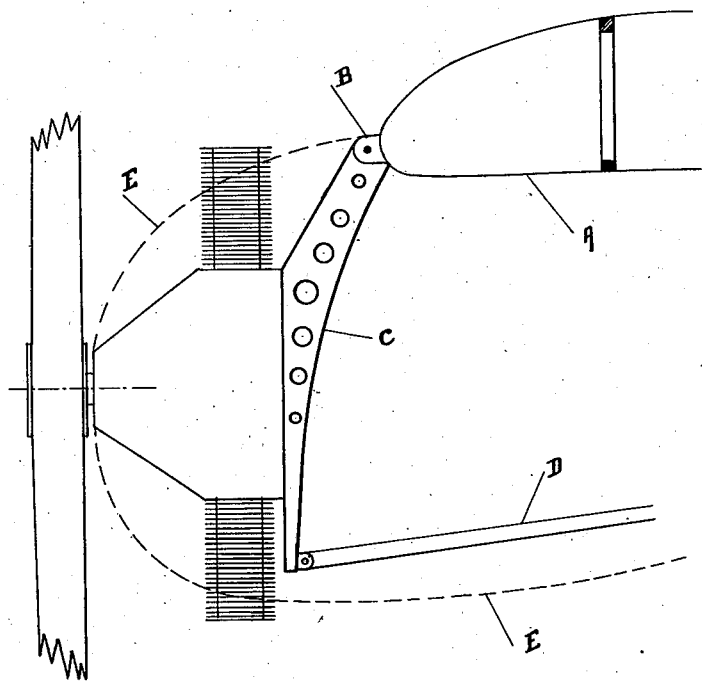
Inventor
Henrich Focke Patented June 17, 1930

1,764,554

UNITED STATES PATENT OFFICE

HENRICH FOCKE, OF BREMEN, GERMANY

ARRANGEMENT OF MOTORS ON THE WINGS OF AIRCRAFT

Application filed January 11, 1930, Serial No. 420,194, and in Germany March 31, 1928.

It is known to suspend the motors of aircraft by carriers or the like to the wings. If then it is desired to fit the motor close in front of or close behind the wing this generally requires carriers projecting far forward or far behind because the carriers have hitherto been fixed to the sills (beams) which lie more or less near to the centre of the wing. To effect this extensive projection of the carriers with the necessary strength entailed the use of heavy weight (i. e. in the sense of a great quantity of resistant material and therefore weight).

According to the invention it is now proposed to suspend a motor frame for example for a star motor direct to two or more correspondingly strengthened ribs of the wing. Then at any rate only the additional weight for this strengthening but not that of a new and additional carrier need be used.

In the drawing a constructional example is shown. On the strengthened ribs A of the leading edge of the wing are mounted lugs B into which the motor frame C is suspended by pins. By means of one or more struts D the frame is strutted in relation to other parts of the aeroplane, for example the wing itself or the under carriage train. The whole can be surrounded in a manner known in itself with a stream line casing E.

In the corresponding way in a thrust propeller motor the suspension may take place on suitable strengthened ribs of the trailing edge of the wing.

I claim:

A motor arrangement on aircraft wings thereby characterised that a motor frame is suspended to suitably strengthened ribs in the neighbourhood of the leading edge or trailing edge of the wing.

In testimony whereof I have hereunto set my hand this 12th day of December, A. D. 1929.

HENRICH FOCKE.